US012647264B2

(12) United States Patent
Horoszczak et al.

(10) Patent No.: US 12,647,264 B2
(45) Date of Patent: Jun. 2, 2026

(54) COMPUTER-IMPLEMENTED METHOD FOR STORING A PAYLOAD DATA IN NODES OF A DLT NETWORK

(71) Applicant: BILLON SP. Z O.O., Warsaw (PL)

(72) Inventors: Andrzej Horoszczak, Warsaw (PL); Michał Wichulski, Warsaw (PL)

(73) Assignee: BILLON SP. Z O.O., Warsaw (PL)

( * ) Notice: Subject to any disclaimer, the term of this patent is extended or adjusted under 35 U.S.C. 154(b) by 169 days.

(21) Appl. No.: 18/563,584

(22) PCT Filed: May 24, 2022

(86) PCT No.: PCT/EP2022/063975
§ 371 (c)(1),
(2) Date: Nov. 22, 2023

(87) PCT Pub. No.: WO2022/248435
PCT Pub. Date: Dec. 1, 2022

(65) Prior Publication Data
US 2024/0364513 A1 Oct. 31, 2024

(30) Foreign Application Priority Data
May 24, 2021 (EP) ..................................... 21175563

(51) Int. Cl.
*H04L 9/14* (2006.01)
(52) U.S. Cl.
CPC ..................................... *H04L 9/14* (2013.01)
(58) Field of Classification Search
None
See application file for complete search history.

(56) References Cited

U.S. PATENT DOCUMENTS

| | | |
|---|---|---|
| 10,552,383 B2 | 2/2020 | Sharma et al. |
| 2018/0375840 A1 | 12/2018 | Moy et al. |
| 2021/0124730 A1 | 4/2021 | Kannan et al. |

OTHER PUBLICATIONS

Canran Wang et al: "Low Latency Cross-Shard Transactions in Coded Blockchain" arxiv. org, Cornwll University Library, 201 Olin Library Cornell University Ithaca, NY 14853 Oct. 30, 2020—XP081806661,—Sections III, IV, figure 1.
(Continued)

*Primary Examiner* — Cai Y Chen
(74) *Attorney, Agent, or Firm* — Polson Intellectual Property Law P.C.; Margaret Polson; Christopher Sylvain

(57) ABSTRACT
The present invention relates to a computer-implemented method for storing a pay load data in nodes of a DLT network, comprising steps: dividing the pay load data into subblocks (x), converting subblocks into compilates (y) using one or more logic operations, distributing compilates (y) over a first set of nodes (C) of the DLT network, sending data representing distribution of compilates (y) over the first set of nodes (C) to a second set of nodes (P) of the DLT network. Further the application discloses a computer-implemented method of reading a payload data from nodes of a DLT network, comprising steps: reading data representing distribution of compilates over a first set of nodes (C) from a second set of nodes (P) of the DLT network, reading compilates (y) from nodes of the DLT network of the first set of nodes (C), converting compilates (y) into subblocks (x) using one or more logic operations, merging subblocks (x) into the pay load data. And computer program comprising instructions which, when the program is executed by a computer in a DLT network, cause the computer to carry out steps of the methods above.

11 Claims, 9 Drawing Sheets

(56)  References Cited

OTHER PUBLICATIONS

Yu Guangsheng et al: "Survey: Sharding in Blockchains" IEEE Access, IEEE, USA, vol. 8, Jan. 8, 2020, pp. 1455-14181, XP011768360 DOI: 10.1109/Access.2020.2965147 retrieved on Jan. 23, 2020.

International Search Report (ISR) mailed Sep. 2, 2022 in parent international application PCT/EP2022/063975.

Written Opinion of the International Searching Authority (WO-ISA) mailed Sep. 2, 2022 in parent international application PCT/EP2022/063975.

Pending U.S. Appl. No. 18/563,576, filed Nov. 22, 2023, first inventor Niemojewski, applicant Billon SP. Z O.O. [Per MPEP 609.07, copy not provided as this is available in the USPTO system].

COMPUTER-IMPLEMENTED METHOD FOR STORING A PAYLOAD DATA IN NODES OF A DLT NETWORK

This invention relates to a computer-implemented method of storing a payload data in nodes of a DLT network, as well as to the computer program product including instructions recorded on a non-transitory computer readable storage medium and configured, when executed by at least one processor, to cause the at least one processor to perform a method according to the invention.

A distributed ledger networks (DLT) are known in the art, according to the commonly accepted definition, DLT network is a distributed ledger (also called a shared ledger or distributed ledger technology or DLT) is a consensus-based replicated, shared, and synchronized digital data spread across multiple sites, countries, or institutions. Unlike a distributed database, there is no central administrator. The distributed ledger database is spread across numerous nodes (devices) on a peer-to-peer network, where each replicates and saves a copy of the ledger and updates itself independently. The primary advantage is the lack of central authority. When a ledger update is about to happen, each node constructs the new set of transaction, and then the nodes vote by consensus algorithm on which copy is correct. Once a consensus has been achieved, the other nodes update themselves with the new, correct copy of the ledger. Security is accomplished through cryptographic keys and signatures.

A detailed knowledge of the blockchain systems is well documented and a skilled person is familiar with publications describing mechanics of the blockchain networks. Textbooks such as *The Bitcoin Standard: The Decentralized Alternative to Central Banking*, by Saifedean Ammous, published by Wiley; 1st edition (Apr. 24, 2018) ISBN-13: 978-1119473862, *Mastering Blockchain: A deep dive into distributed ledgers, consensus protocols, smart contracts, DApps, cryptocurrencies, Ethereum, and more*, by Imran Bashir published by Packt Publishing (Aug. 31, 2020) ISBN-13:978-1839213199, and *Mastering Bitcoin: Programming the Open Blockchain*, by Andreas M. Antonopoulos published by O'Reilly Media; 2nd edition (Jul. 11, 2017) ISBN-13:978-1491954386, provide all necessary background knowledge to be familiar with blockchains technology.

Networks like DLT can be used to store payload data, for examples files, sales data, or personal records and there is a number of approaches to complete such task. For example the US2021124730A1 discloses a blockchain based distributed file systems, where a blockchain system is associated with a distributed file system. Some examples include creating a block in the blockchain system for each action performed while performing a transaction in relation to a file stored in the distributed file system. The created block includes information identifying one or more of a signature of metadata of the file or a signature of data content of the file. Some examples include performing audit on a file, through a blockchain system, to validate consistency of the file.

In U.S. Pat. No. 10,552,383B2 a method and system for data conversion and data model optimization is disclosed for conversion of a structured database into an unstructured database. Initially, the structured database and a database descriptor is retrieved in a distributed environment. The structured database comprises data fields, and each of the data fields corresponds to financial transaction. An optimized target data model is generated for storing data in the unstructured database, based on at least one of database objects extracted from data fields of the structured database, and pre-defined conversion rules. Further, a Blockchain is comprising blocks corresponding to each financial transaction of the structured database. Each of the blocks comprises at least one of extracted database objects. Conversion of the database object of each of the blocks into data fields of unstructured database is performed based on optimized target data model and a notification corresponding to data fields of the unstructured database is generated which are associated with discrepancies corresponding to the financial transaction.

CANRAN WANG ET AL: "Low Latency Cross-Shard Transactions in Coded Blockchain", ARXIV.org CORNELL UNIVERSITY LIBRARY, 201 OLIN LIBRARY CONRLELL UNIVERSITY ITHACA, NY 14853, 30 Oct. 2020, XP081806661 discloses sharding of DLT network comprising a concatenated transactions.

YU GUANGSHENG ET AL: Survey: Sharding in Blockchains ", IEEE ACCESS, IEEE, USA vol. 8, 8 Jan. 2020 (2020-01-08), pages 14155-14181, XP011768360, DOI: 10.1109/ACCESS.2020.2965147 [retrieved on 2020 Jan. 23] discloses sharding in DLT networks.

US2017/375840 A1 discloses a method for interacting with a plurality of distributed ledgers that may include: receiving a client request comprising a payload to be written to one of a plurality of distributed ledgers and metadata extracted from the client request; identifying a destination distributed ledger of the plurality of distributed ledgers; logging a source of the request and the destination distributed ledger; encrypting the payload; and routing the encrypted payload to the destination distributed ledger.

All known solutions rely on standard cryptographic solutions with a public-private key cryptography that provides security due to payload data. Public-key cryptography, or asymmetric cryptography, is a cryptographic system that uses pairs of keys: public keys (which may be known to others), and private keys (which may never be known by any except the owner). The generation of such key pairs depends on cryptographic algorithms which are based on mathematical problems termed one-way functions. Effective security requires keeping the private key confidential; the public key can be openly distributed without compromising security. As such public-key cryptography is a single layer of protection, that can be compromised either due to a flaw in implementation or a backdoor implemented into architecture.

The present invention relates to a computer-implemented method for storing a payload data in nodes of a DLT network, according to claims 1 to 6.

The present invention relates also to a computer-implemented method of reading a payload data from nodes of a DLT network, according to claims 7 to 9.

Further the present invention relates to a computer program comprising instructions which, when the program is executed by a computer in a DLT network, cause the computer to carry out steps of the method of claims 1 to 6. And to a computer program comprising instructions which, when the program is executed by a computer in a DLT network, cause the computer to carry out steps of the method of claims 7 to 9.

The advantage of the present invention is that on top of the cryptographic layer it adds additional protection mechanisms to protect payload data by decomposing payload data into unstructured data so called compiles and by a dispersion of an unstructured data among the nodes of the blockchain network. All three different in character technics applied together provide the level of security that is robust and trustworthy.

The details of one or more implementations of the present invention are set forth in relation to the accompanying drawings.

Figure 2:
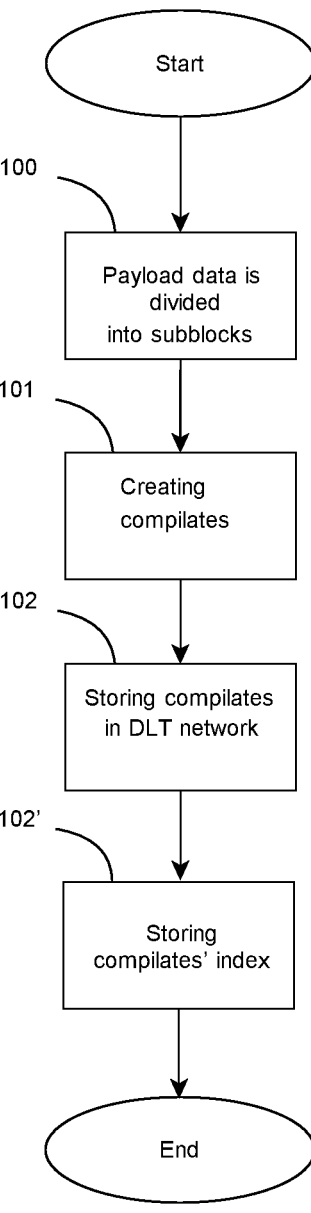
FIG. 2 shows a block diagram of the method of storing data in a DLT network according to the invention.
Figure 5:
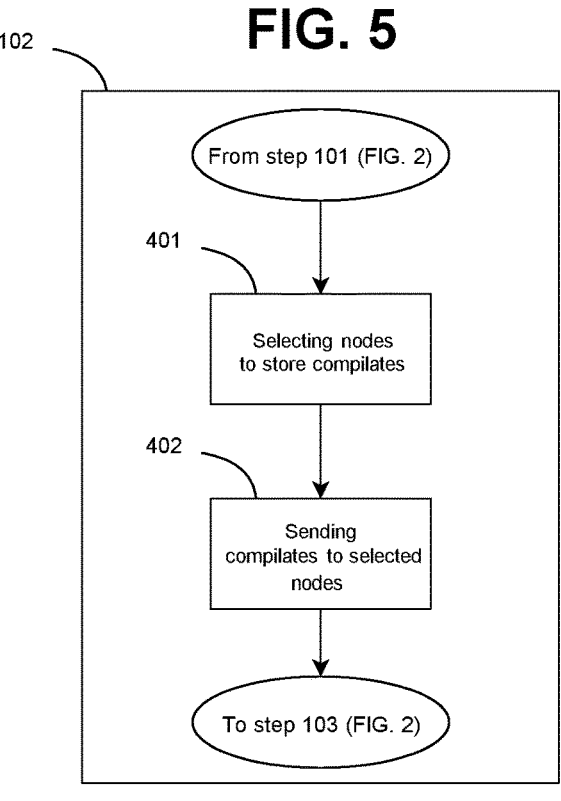
FIG. 5 shows distributing compilates to data sharing system in an exemplary embodiment in greater detail as initially shown in item 102 (FIG. 2)
Figure 5:
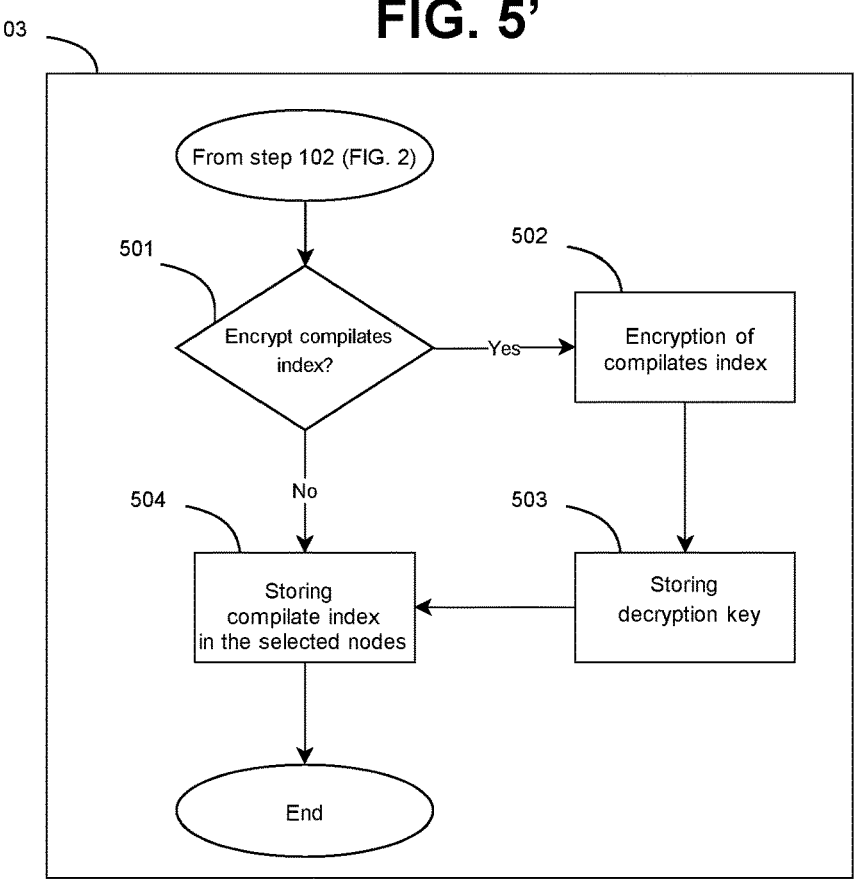
Figure 6:
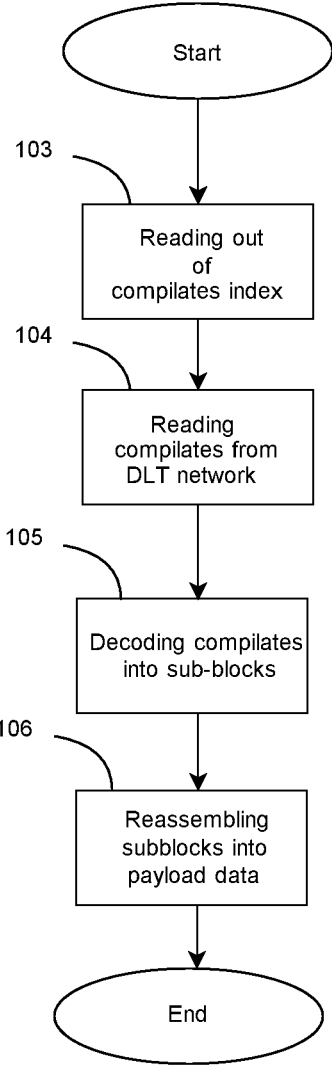
Figure 7:
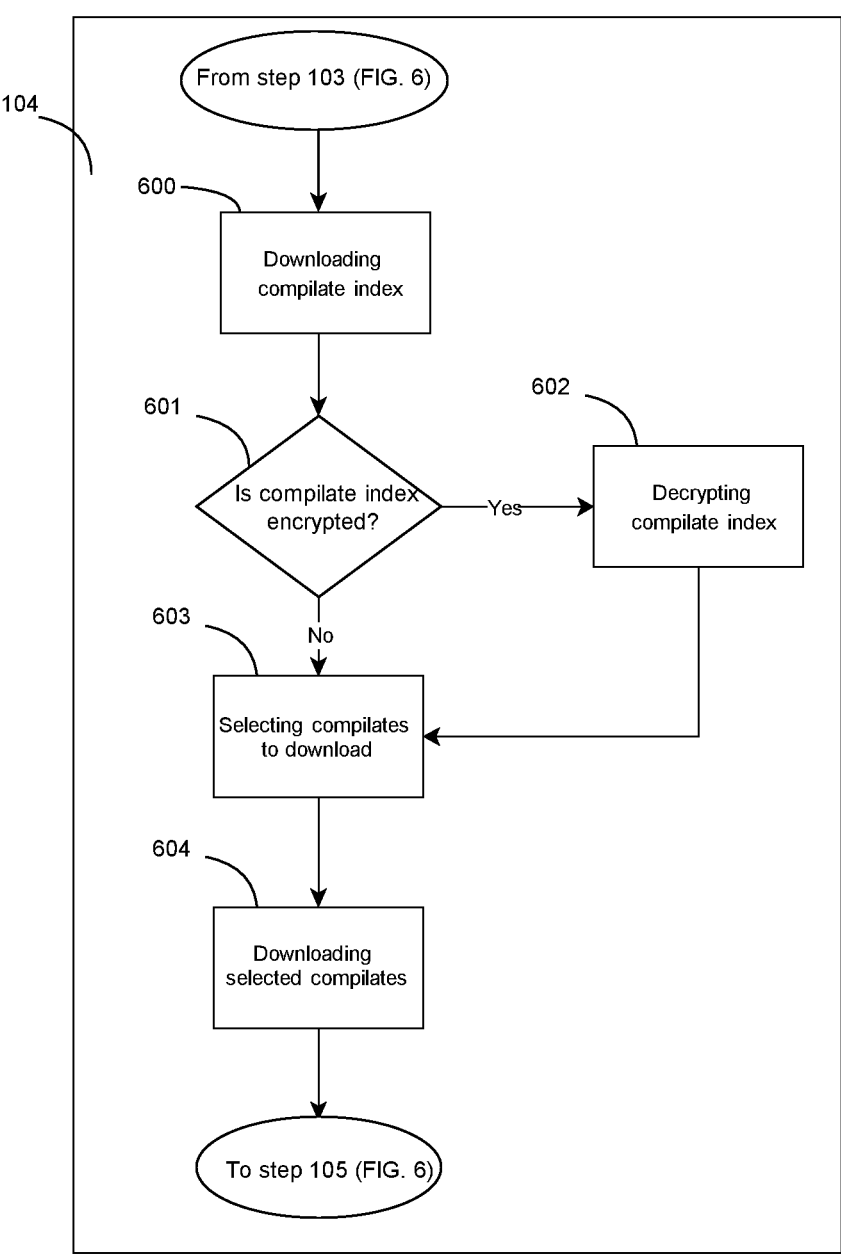
Figure 8:
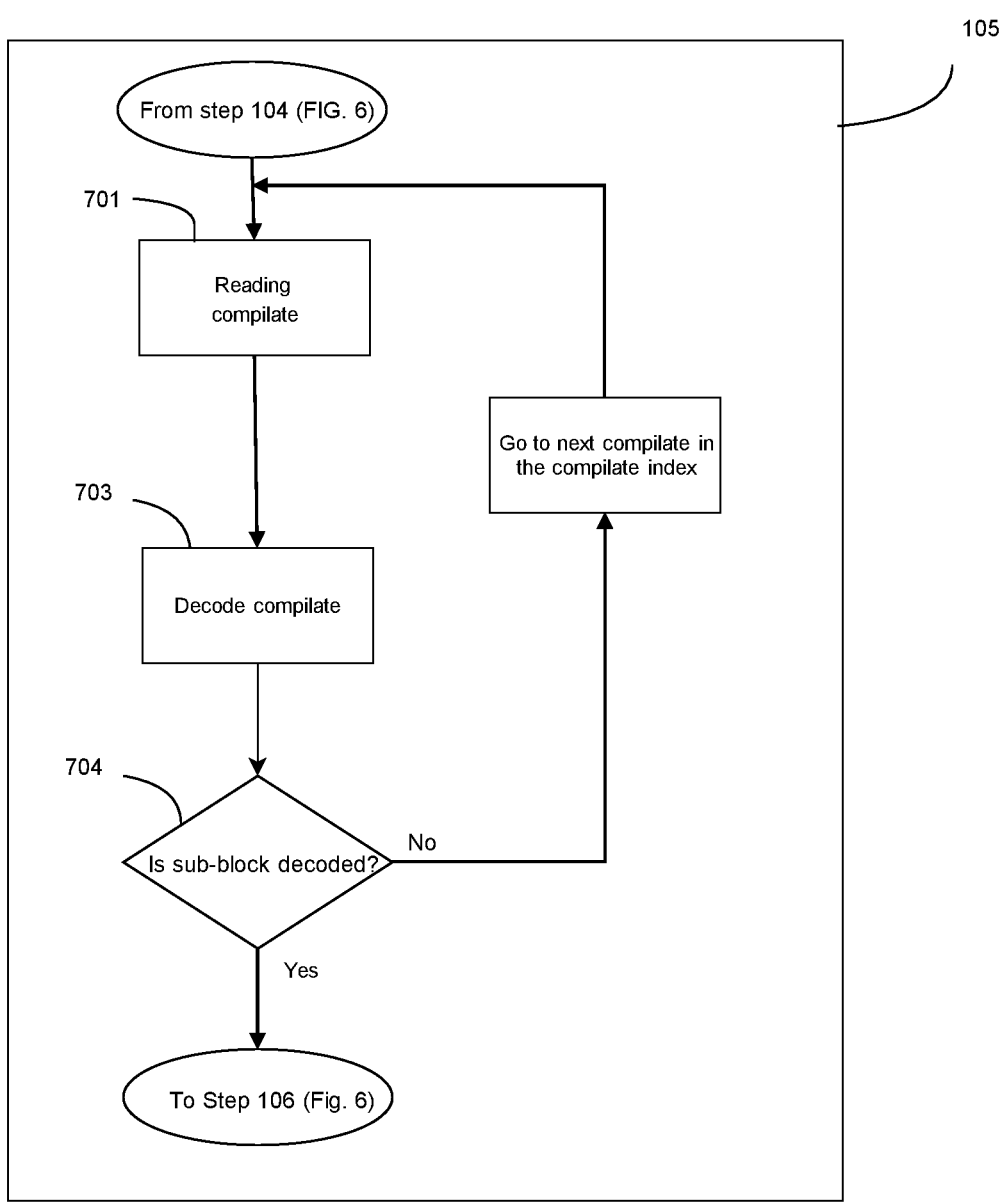
Figure 9:
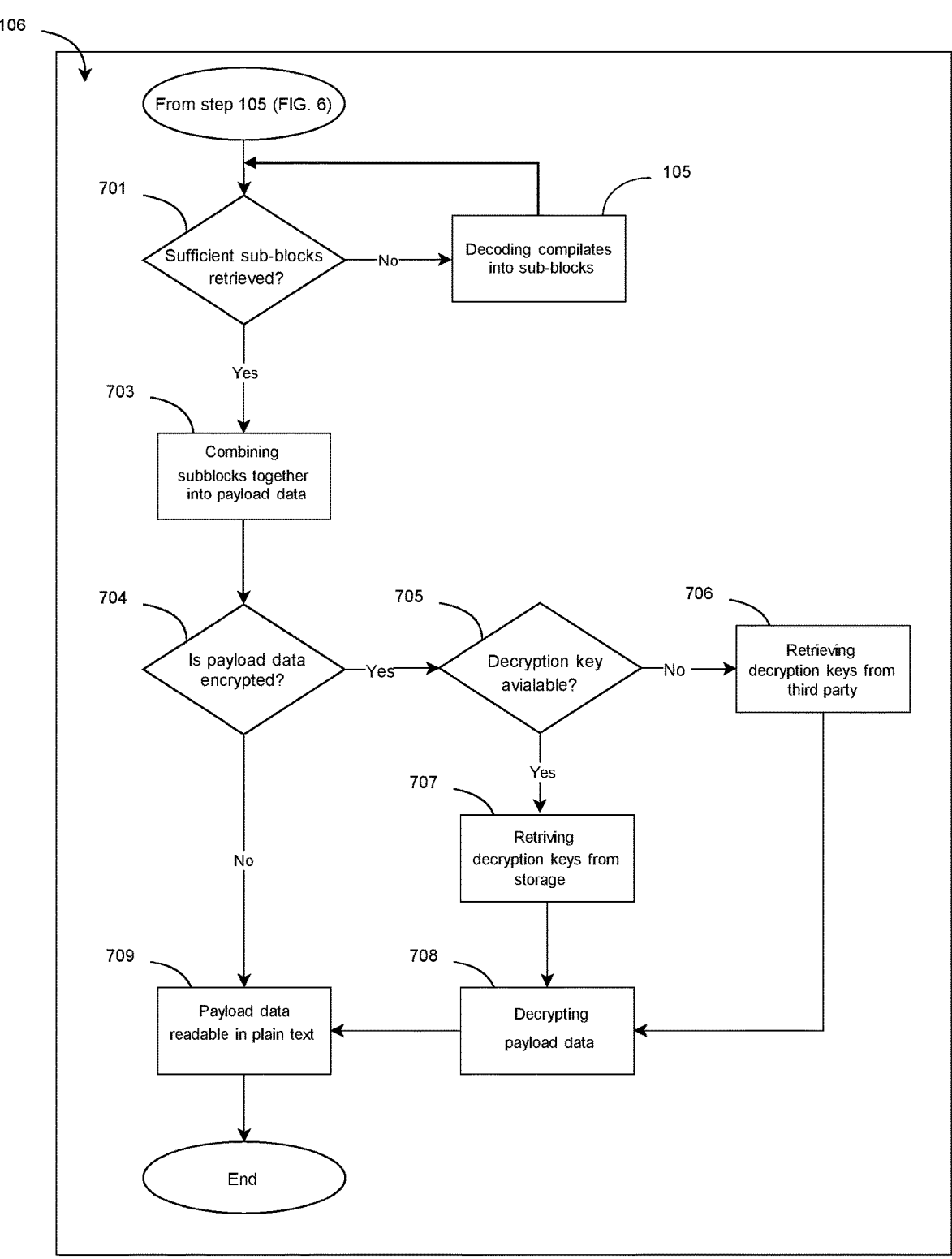

FIG. 5' shows optional step of encrypting compilates index in an exemplary embodiment in greater detail as initially shown in item 103 (FIG. 2);

FIG. 6 shows a block diagram of the method of reading data in a DLT network according to the invention;

FIG. 7 shows a block diagram of reading compilates from adequate location in an exemplary embodiment in greater detail as initially shown in item 104 (FIG. 6);

FIG. 8 shows a block diagram of recreating a subblock from a compilate in a in an exemplary embodiment in greater detail as initially shown in item 105 (FIG. 6);

FIG. 9 shows a block diagram of recreating a payload data using a sufficient plurality of compilates and a compilates index in an exemplary embodiment in greater detail as initially shown in item 106 (FIG. 6)

Figure 1:
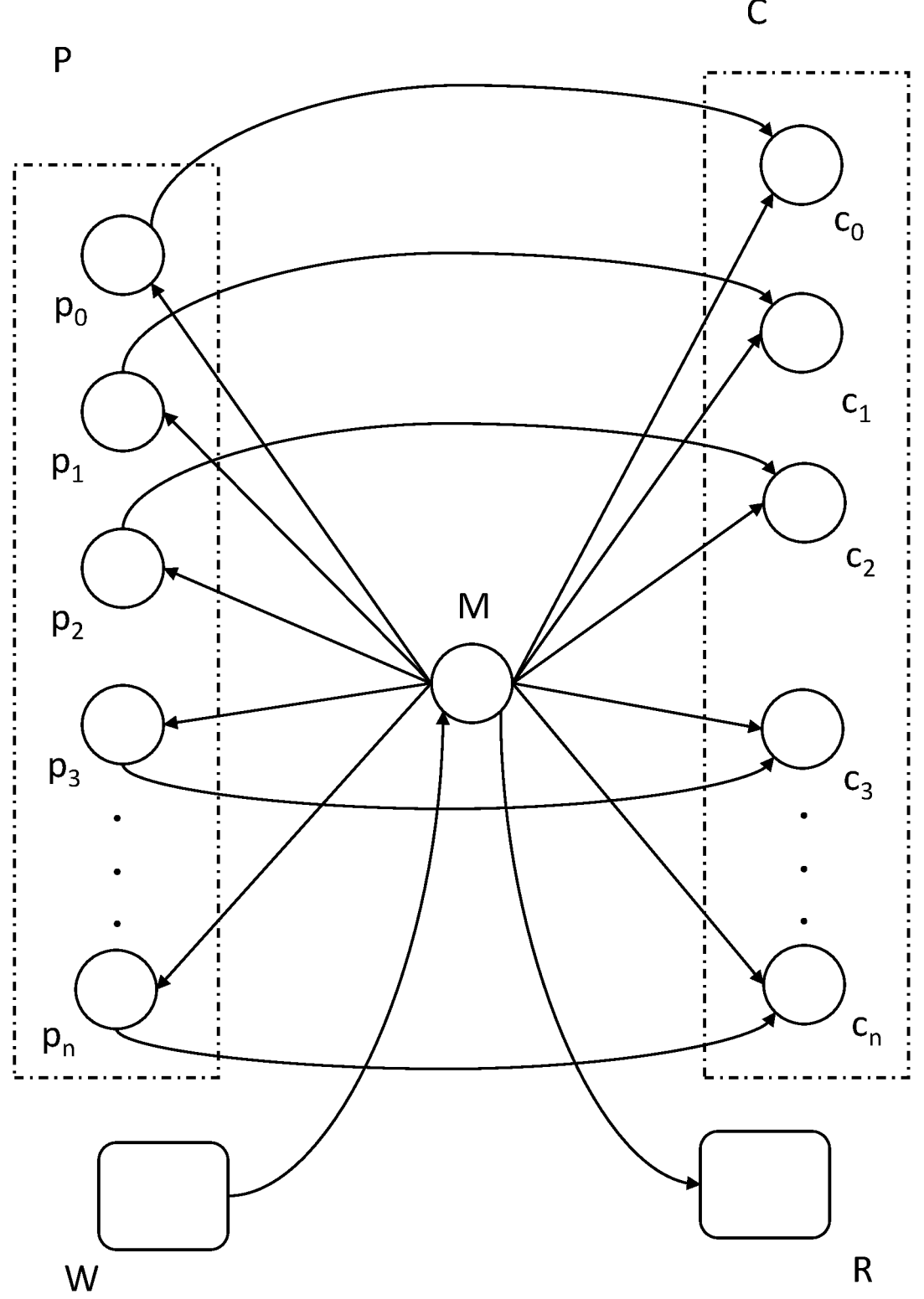
FIG. 1 shows a diagram of the DLT network supporting the methods according to the present inventions.

FIG. 1 shows a diagram of the DLT network supporting methods according to the present inventions. The DLT network comprises nodes being parts of two disjoint sets of nodes denoted as P and C, while P stands for pointers and C stands for compilates. The sets of nodes are disjoint if they share no common node. Further a DLT network comprises a node M that is controlling the process of storing a payload data with the DLT network. The payload data are sent to the DLT network for storing by a writing agent W i.e. a computer system that is working above the layer of the DLT network. The payload data can be retrieved from the DLT network by a reading agent R, also a computer being operating above the layer of the DLT network. In a preferable embodiment the writing agent W and the reading agent R, are functionalities of the one computer system. The reading agent R can use any of the nodes of DLT network in order to read the payload stored in compilates in nodes C. Moreover the reading payload data is not allowed to the entities other than the ones that stored the payload data within DLT network, however the rules of access may follow well stablished file system right management schemas known from the traditional file systems, and allow reading data by other entities than the writing agent W.

Nodes of the DLT network are nodes of the blockchain ledger, and actions made by nodes are within the "mechanics" of the blockchain i.e. sending a payload data to the node means a registration of a transaction within the DLT network, etc. The sets of nodes C and P, can be arbitrary large. However practical implementation provides common sense limits due to computational complexity depending on the particular implementation of algorithms, grows exponentially with the size of the sets P and C. Preferably a dedicated node M of the DLT network is responsible for storing and/or reading payload data within the DLT network.

The writing agent W, the reading agent R and the node M functionalities preferably are implemented on the different computer systems interacting with different user.

The payload data are not limited to any kind of data and might be in a form of file or being direct input from a user interacting with a user interface of any form.

FIG. 2 illustrates an example method according to the preferred embodiment of the invention where the writing agent W sends data for storing into the DLT network as shown on FIG. 1.

A computer-implemented method for storing a payload data in nodes of a DLT network, comprising steps of: dividing the payload data into subblocks, converting subblocks x into compilates y using one or more logic operations, distributing compilates y over a first set of nodes C of the DLT network, sending data representing distribution of compilates over the first set of nodes C to a second set of nodes P of the DLT network.

Preferably the second set of nodes P of DLT network is disjoint with the first set of nodes C of DLT network. Disjoint sets of nodes do not share a common node, Keeping nodes C and P in disjoint sets increases a spread of decomposed payload over a larger number of nodes within DLT network.

The node M decomposes data into compilates and saves payload data in distributed ledger. While later reading agent R requests the node M to reassemble the original information from a sufficient plurality of compilates. In one of embodiments the node M interacting with reading agents R is the same node of the DLT network that was interacting with writing agent W, however it may be a different node of the DLT system.

In step 100 the process of decomposition may be initiated by transforming and dividing the payload data into subblocks. A subblock may be defined as a one-dimensional array of bits which is a subset of the payload data. In the preferred embodiment, the payload data is divided into equally long subblocks such that no two subblocks include the same part of the payload data. The operation of dividing payload data into subblock can be carried out as selecting consecutive parts of the payload data or it may introduce some degree of interleaving or jumps over the payload data to create blocks that are not sequential. In some embodiments it may be required that subblocks are representable as binary files, so that logical operators may be performed against this data. This step is further detailed in FIG. 3.

After the payload data is divided into subblocks, in step 101, the node M uses each subblock to generate a number of compilates. A compilate is defined as a set of data that, when combined with other compilates, can be used to recover original information, yet it does not contain any part of original information itself. Compilates may be created by applying logical operators to one or more subblocks that represent part of the payload data. In the preferred embodiment, each compilate is created by applying logical operators to two or more subblocks. This step is further detailed in FIG. 4.

After creating one or more compilates, the node M delivers them to the target location or locations in a second set of nodes denoted as C as in step 102. In the preferred embodiment, compilates are saved in a distributed ledger in such way, that none of the nodes stores more than one compilate created from the same piece of payload data. In other embodiments, compilates may be stored within another form of data sharing system or data storage solutions including but not limited to, distributed or centralized databases, flat files, binary data, hardware memory or disk storage solutions, cloud storage, and such. This step is further detailed in FIG. 5.

Figure 3:
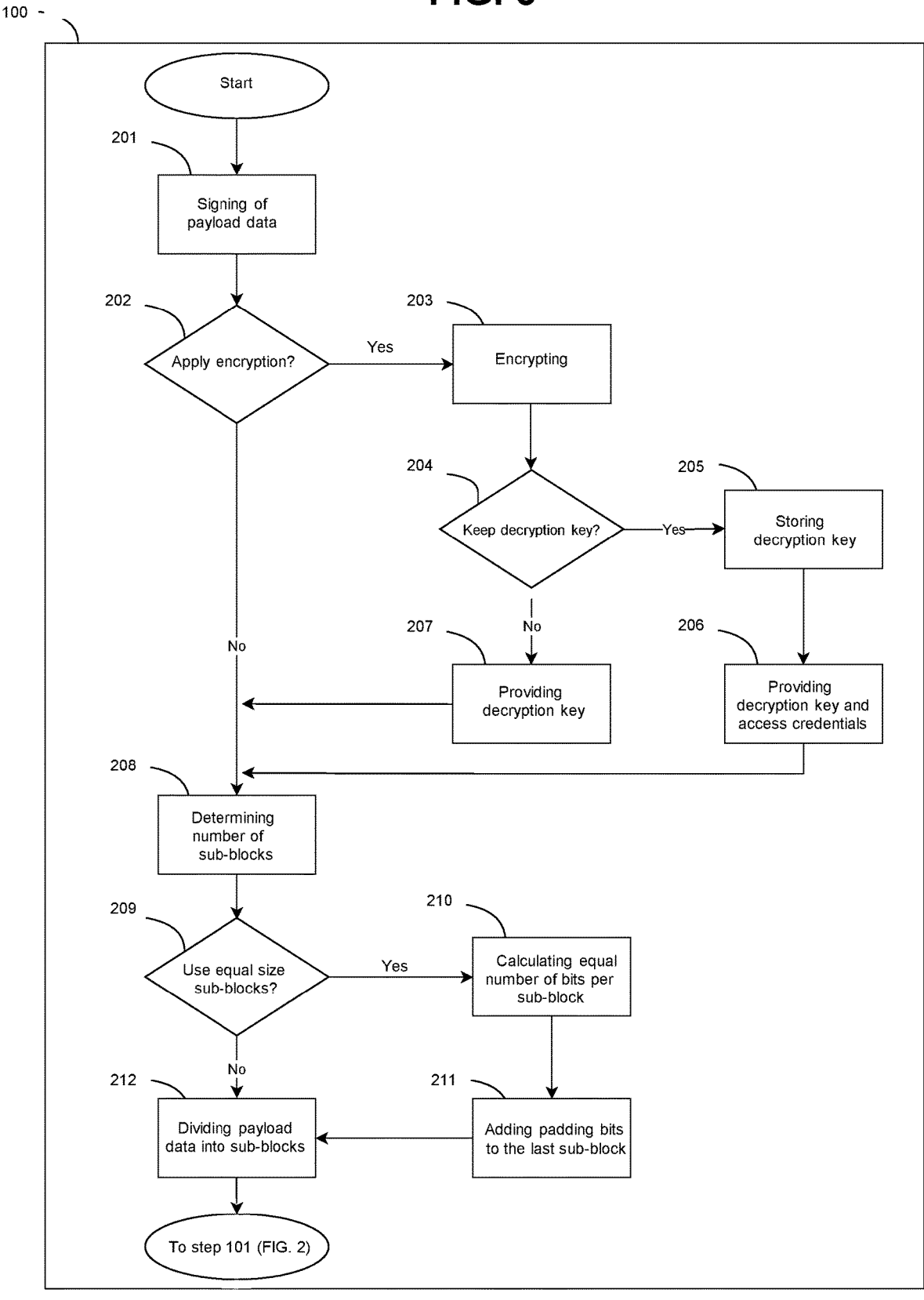
FIG. 3 shows a block diagram of creating subblocks in an exemplary embodiment in greater detail as initially shown in item 100 (FIG. 2)

FIG. 3 illustrates an example method by which the node M may transform and divide the payload data to create subblocks. FIG. 3 shows in greater detail what was initially described in step 100 in FIG. 2. In step 201 the writing agent W may sign the original information to enable further verification of its authenticity. In the preferred embodiment, the writing agent W may use one or more private keys to sign the original information, and send the associated public key(s) to the reading agent R in further steps of the process. In other embodiments, the writing agent W may use any other digital signature method, or they may choose to not sign the original information.

In step 202, the writing agent W decides whether to encrypt the original information. This decision may be taken based on a configuration data or in the interaction with an end user. Encryption may be used to ensure that the payload data is protected after the reading agent R reconstructs subblocks from compilates in step 701, however it is not mandatory for following steps.

If the writing agent W proceed to encrypt the payload data, this process occurs in step 203. In the preferred embodiment, the payload data may be encrypted with a symmetric key, using AES256 cryptography in order to make the original information available to both writing agent and reading agent. In other embodiments, any other method of encryption including, but not limited to RSA, Elliptic Curves (ECIES), 3DES, Blowfish, Twofish, IDEA, MD5, SHA1 and HMAC may be applied. In this step, the node M chooses to apply a symmetric or asymmetric ciphers before or after the encryption itself to decrease likelihood of breaking the encryption itself. Symmetric or asymmetric cyphers may be used multiple times. In the preferred embodiment, the node M is applying all-or-nothing transform before the encryption is applied.

After encryption of the payload data, the writing agent W may provide the decryption method to the reading agent R in step 204. In some embodiments, the reading agent R may be provided with the decryption key simultaneously with any step prior to step 704 (FIG. 7) In the preferred embodiment, the decryption key may be provided at the same time as the decryption key for the compile index in step 503 (FIG. 6).

After the optional step of encrypting the payload data, the node M determines in step 208 how many different subblocks shall be generated. The number of chosen subblocks, denoted as s, determines number of different compilates, that may be generated in step 303 (FIG. 4), which may be denoted as $2^s$-1.

In the preferred embodiment, each subblock is an equally long sequence of bits, which ensures that length of each of the subblocks is not required to solve the equation in step 703 (FIG. 8). In other embodiments, the subblocks may consist of different number of bits, however the information on length of each of the subblocks may be required to retrieve them in further steps. In order to ensure that the subblocks generated in step 212 are equally long string of bits, the node M verifies in, step 209, whether it is necessary to include additional bits to the original information, that may be signed and encrypted. Verification is performed by calculating value of formula k mod s, where k is a number of bits of payload data that may be signed or encrypted, and s is the number of subblocks determined in step 208. If value of the formula is equal to 0, then additional bits will not be added to the original information.

In case value of the formula calculated in step 209 is not equal to 0, the node M add b=s−(k mod s) bits in step 211 to the payload data that may be signed or encrypted, padding bits need to be added in step 211. In the preferred embodiment, each of the padding bits is generated independently by pseudorandom number generator. In other embodiments, padding bits may be generated with other method or may be set to a constant value.

After ensuring subblocks are of equal length, or deciding that it is not necessary, the node M creates subblocks in step 212 by dividing the original information that may be signed or encrypted and include additional bits if needed. In preferred embodiment, subblocks may be created in such a way, that i-th subblock, where i∈ l={1, 2, . . . , s}, consists of $$\frac{k+b}{s}$$

bits of the payload data that may be signed or encrypted and may include additional padding bits, starting from $$\left[1 + \frac{(i-1)\times(k+b)}{s}\right] - th.$$

In other embodiments, each subblock may represent any sequence of bits of the payload data or may combine any number of individual bits of the original information, provided such selection scheme is known at reading.

Figure 4:
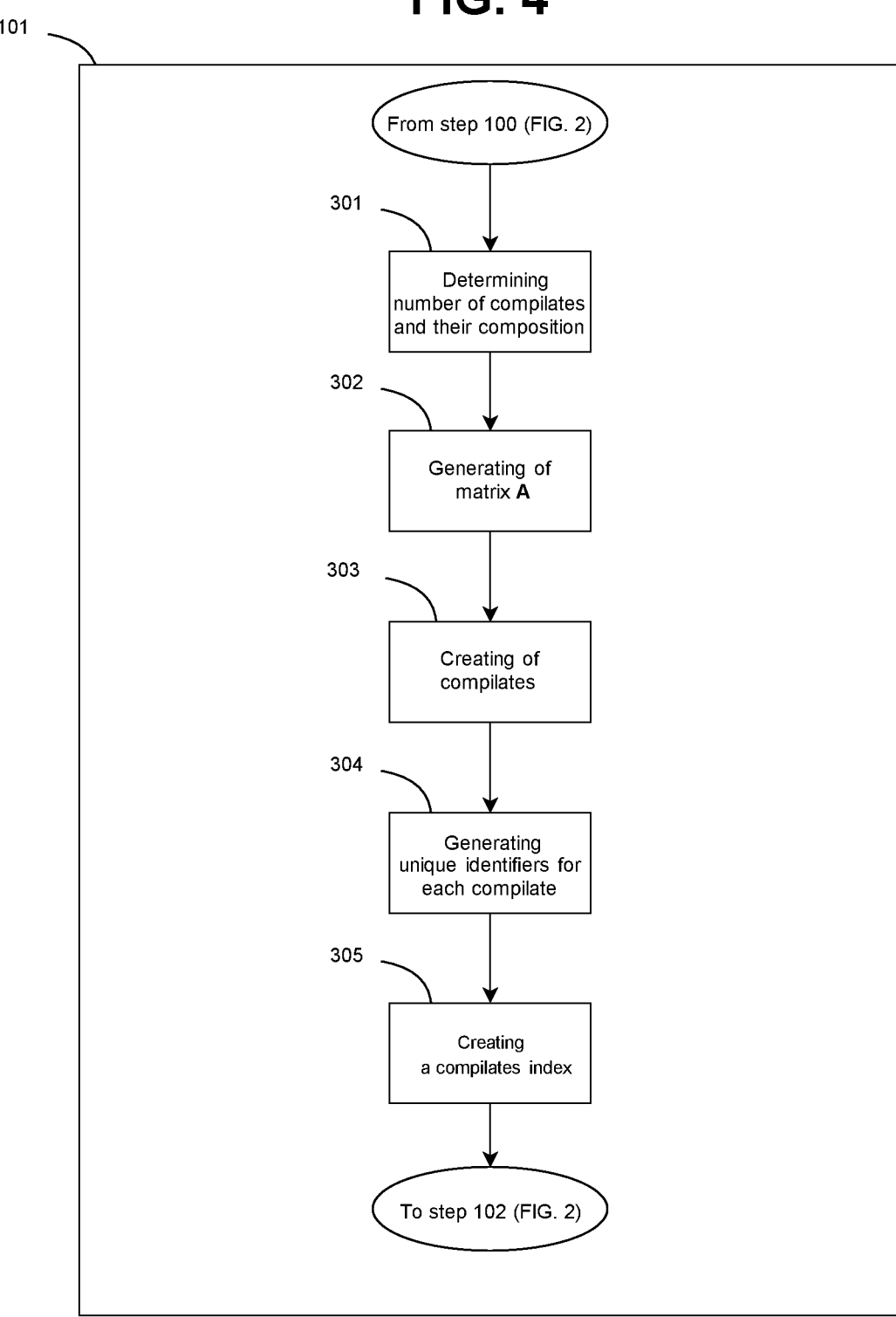
FIG. 4 shows a block diagram of generating compilates and a compilates index using compilates identifiers and a binary matrix in an exemplary embodiment in greater detail as initially shown in item 101 (FIG. 2)

FIG. 4 illustrates an example method by which the node M generates a number of compilates using the subblocks generated in step 212 (FIG. 3), and a compilates index using compilates identifiers and a binary matrix A or a first matrix referenced as A. FIG. 4 shows in greater detail what was initially described in item 101 (FIG. 2). Step 301 proceeds from step 100 in FIG. 2, where the node M created subblocks by transforming and dividing the payload data. In step 301, the node M may determine number of compilates and which subblocks created in step 208 (FIG. 2) shall be used to create each of the compilates. In the preferred embodiment, the node M creates $s^2$-s-1 compilates, where each of the compilates is generated using a different two or more-element variation of subblocks. In other embodiments, any number greater or equal to zero may be created from each of 2 or more-element variation of subblocks.

Afterwards, the node M records the information on number of compilates and their composition in step 302. In preferred embodiments, this information may be recorded as the binary matrix A size (c×s), where c denotes a number of compilates, s denotes a number of subblocks, and an individual item $a_{(i,j)}$ determines, whether j-th subblock shall be used to create i-th compilate. In further embodiments, information on number of compilates and their composition may be recorded by function f(i): I→R, where I is a set of compilate numbers or a set of compilate identifiers generated in step 304 (FIG. 4), and R is set of vectors r, where individual item n determines whether j-th subblock shall be used to create a compilate. In still further embodiments, information on number of compilates and their composition may be recorded using other means including matrices, injective, surjective, bijective, set and choice functions, formulas, graphs and free text.

Then, in step 303, the node M generates compilates in compliance with the information recorded in step 302. In the preferred embodiments, each compilate may be created by applying XOR between selected subblocks generated in step 100 (FIG. 2). In other embodiments, compilates may be created using other logical operators including, but not limited to AND, NAND, OR, NOR, NOT, XNOR, implication, converse implication, nonimplication and converse nonimplication.

In one of the preferred embodiments the step 303 of converting subblock into compilate involves: establishing a distribution D; establishing a total number of compilates j equal to the numbers of the nodes of the first set C; sampling the distribution D to establish a vector of coefficients a of a length k equal to number of subblocks, such that the samples are chosen independently from each other; and obtaining a compilate y for the node j in the first set of nodes C by $$y_j = \sum_{i=1}^{k} a_i x_i$$

while the distribution D is such that the matrix A is the first matrix comprising coefficients a of compilates y, and the matrix A is a full rank matrix that can be converted into upper triangular matrix.

When compilates are generated, each of them may be given a unique identifier in step 304. In the preferred embodiment, unique identifier for each compilate may be as well its unique address in distributed ledger. Unique identifiers are stored separately in nodes P from the compilates that are stored in the nodes C of the DLT network.

Afterwards, the node M combines list of generated identifiers with information recorded in step 302 to obtain compilates index. In the preferred embodiment, compilate index is created by merging binary matrix generated in step 302 with the list of compilates' identifiers generated in step 305 in such way, that each compilate identifier is connected to the row in a matrix A corresponding to that compilate. In other embodiments, compilate matrix may use different methods to combine information on which subblocks have been used to create a compilate with its identifier. The compilate index is stored in the nodes P of DLT network along with unique identifiers or is separately stored on node M, alternatively or additionally send back to writing agent W, directly to the reading agent R, or outside the DLT network.

FIG. 5 illustrates steps taken by the node M to save the compilates generated in step 101 (FIG. 2) in distributed ledger. FIG. 5 shows in greater detail what was initially described in step 102 (FIG. 2). In step 401, proceeding from step 101 (FIG. 2), the node M determines the location, where each of the compilates might be stored. In preferred embodiments, the system distributes the compilates such that none of nodes of the set C receives more than one compilate. This ensures that any node within set C has a zero chance of reassembling the original payload data. In other embodiments, the node M sends arbitrary or well defined number of compilates larger than one, to each of the nodes of the set C. In still further embodiments, compilates may be stored in other data sharing systems including but not limited to, distributed or centralized databases, flat files, binary data, hardware memory or disk storage solutions, cloud storage, and such.

Afterwards, in step 402, the compilates are sent to the nodes of DLT network being members of the second set of nodes denoted as C. In one preferred embodiment of the method according to the invention, the step of distributing compilates over the first set of nodes C of the DLT network, is adapted to place a limited number of compilates y at one node of the first set of nodes C, while a number of compilates at one node of the first set of nodes C is lower than total number of compilates j. In yet preferred embodiment nodes of the first set of the nodes C of the DLT network are in a different physical locations than the nodes of the second set of the nodes P of the DLT network.

In the presented embodiment the node M handles the data processing operations and management of the process however functionality of the node M may be implemented in any node of the DLT system and depending on the situation the particular physical node might be the node M for the purpose of storing the first payload data, and the same physical node of DLT network may be a node in the set P of nodes for the purpose of storing a second payload data, and still the same physical node of DLT network may be a node in the set C of nodes for the purpose of storing a third payload data. The possibility to change the functions of the nodes gives to the method additional flexibility, and further increase security of the payload, as defined architecture of the system, preferably exists only for the purpose of storing a single payload, and may change when storing another payload. When storing the second payload physical nodes may change their functions and memberships in sets C and P.

FIG. 5' shows in greater detail what was initially described in step 102' (FIG. 2). After saving the compilates in their target locations in step 102 (FIG. 2) in nodes of the set C, the node M decides in step 501, whether to encrypt the compilates index. This is done based on a configuration file or in response to input provided the user. The encryption may be used to hinder unauthorized use of compilates index to reassemble the original information, however it is not mandatory for further steps.

Assuming, that the configuration is to encrypt the compilates index, the node M does it in step 502. In preferred embodiment, for this purpose, the node M may use the same symmetric key that has been used in step 203 (FIG. 3). In other embodiments, the node M chooses to encrypt the compilates index using other symmetric or asymmetric key using cryptographic methods that include, but are not limited to AES256, RSA, Elliptic Curves (ECIES, ECDS), 3DES, Blowfish, Twofish, IDEA, MD5, SHA1, HMAC and such.

After encrypting the compilates index, the node M may provide the reading agent R with a method to decrypt the compilates index in step 503. In preferred embodiments, the symmetric key used in step 501 may be encrypted using a public key of the reading agent. Then the encrypted key is attached to the compilates index. In other embodiments, a decryption method and device is provided to the reading agent R using other data sharing systems including, but not limited to distributed or centralized databases, flat files, binary data, hardware memory or disk storage solutions, cloud storage.

The compilates index that may have or have not been encrypted is then provided to the reading agent R in step 504. In preferred embodiments, the node M may send encrypted compilates index alongside with encrypted symmetric key to one of the nodes of the distributed ledger in the set P. Then the address of the compilates index may be sent to the reading agent R, which enables to receive the compilates index from the nodes in set P. In other embodiments, the compilates index may be delivered to the reading agent R, using other data sharing systems including, but not limited to distributed or centralized databases, flat files, binary data, hardware memory or disk storage solutions, cloud storage, and such.

In step 103 the node M may provide the reading agent R with the means in a form of a list of nodes P which store the location of nodes C, and compile index, to obtain sufficient plurality of compilates, and with information regarding the method to use them to reassemble original information. In the preferred embodiment, the writing agent W provides the reading agent R with the index of nodes P pointing to locations of compilates in distributed ledger, and information allowing to reconstruct subblocks from a correct combination of compilates, e.g. a compilates' index. Alternatively compilates' index is distributed over the nodes in the set P of nodes, along with addresses of nodes in C storing compilates y. This step is further detailed in FIG. 6.

FIG. 6 illustrates an example a computer-implemented method of reading a payload data from nodes of a DLT network, comprising steps: reading data representing distribution of compilates over a first set of nodes C from a second set of nodes P of the DLT network, reading compilates y from nodes of the DLT network of the first set of nodes C, converting compilates y into subblocks x using one or more logic operations, merging subblocks x into the payload data.

In the preferred embodiment the second set of nodes P of DLT network is disjoint with the first set of nodes C of DLT network.

FIG. 7 illustrates an example of a method by which the node M may obtain compilates sufficient to reassemble the original information. In some alternatives, the method may significantly differ from the process described in FIG. 7 which may be applied in case compilates have been saved in distributed ledger. In step 600 compilates are downloaded from nodes of the first set of nodes C of DLT network. Step 601 is a conditional, proceeding from step 103 (FIG. 6). If the compilates index had been encrypted in step 502, the node M may decrypt using a method provided in step 602. In the preferred embodiment, the node M decrypts the symmetric key that has been attached to the compilates index in step 503 using its private key, and then uses the symmetric key to decrypt the compilates index.

After the compilates' index have been decrypted, in a case it was previously encrypted, or after reading the compilates' index in a case it was not previously encrypted, the node M determines using compilates' index, in step 603, which compilates shall be used to reassemble the original information. The minimum number of compilates that gives non-zero probability of retrieving the original payload data is equal to the number of subblocks determined in step 208 (FIG. 3). In the preferred embodiment, the node M chooses s compilates, where s is the number of subblocks determined in step 208. To decompose compilates back into the subblocks a second matrix referenced as B is used. The second matrix B is an upper triangular matrix derived from the first matrix A. This ensures that the subblocks may be successfully reassembled in step 703, 704 (FIG. 8), starting from the compilate of a rank one assigned to the bottom row of the matrix B. In other embodiments, the node M may choose any number of compilates equal or greater than s, however it may not ensure that the subblocks may be successfully reassembled in step 703, 704 (FIG. 8).

Afterwards, in step 604, the node M gathers compilates that shall be used to reassemble the subblocks. In the preferred embodiment, the unique identifiers of the compilates included in the compile index may be used to download them directly from the nodes in the set C. In alternative solutions, the compilates may be downloaded from any other data sharing system including, but not limited to distributed or centralized databases, flat files, binary data, hardware memory or disk storage solutions, cloud storage, and such.

FIG. 8 illustrates an example method by which the node M reassembles the original information from the compilates, in greater detail than it has been described in step 105 (FIG. 6). After gathering the compilates in step 104 (FIG. 6), the node M reassembles subblocks, that have been generated in step 100 (FIG. 2) from the compilates in step 703, 704, by arranging compilates $y_j$ with coefficients b of the second matrix B, while the second matrix B is an upper triangular matrix derived from the first matrix A. Then selecting a compilate $y_j$ that is of a rank one, and converting the compilate $y_j$ of rank one into a subblock x, subtracting of the compilate $y_j$ from remaining higher ranked compilates y comprising the compilate $y_j$, repeating the steps above until there is no more compilates to convert.

In the preferred embodiment, the process of decoding may be described as solving a sequence of XOR equations:

$$
\begin{array}{lllllll}
(b_{1,1} \times r_1) & \oplus & (b_{1,2} \times r_2) & \oplus & \ldots & \oplus & (b_{1,s} \times r_s) & = c_1 \\
(b_{2,1} \times r_1) & \oplus & (b_{2,2} \times r_2) & \oplus & \ldots & \oplus & (b_{1,s} \times r_s) & = c_2 \\
\ldots & \oplus & \ldots & \oplus & \ldots & \oplus & \ldots & = \ldots \\
(b_{s,1} \times r_1) & \oplus & (b_{s,2} \times r_2) & \oplus & \ldots & \oplus & (b_{s,s} \times r_s) & = c_s
\end{array}
$$

where $b_{i,j}$ is an element of a nonsingular matrix B, $r_i$, is i-th, unknown subblock, and $c_j$ is a j-th compilate chosen in step 704. The matrix B is an upper triangular matrix derived from the matrix A. In other embodiments, the equations may be corresponding to another logical operator used in step 303 (FIG. 4).

FIG. 9 shows a block diagram presenting final steps of the method for converting compilates y into subblocks x using one or more logic operations, and merging subblocks x into the payload data. The control flow loops over compilates until all subblocks are fully decoded. The step 105 of decoding a compilate is repeated as long as it is required to decode sufficiently large number of compilates to recreate all subblocks, preferably until all compilates are decoded.

After retrieving the subblocks from the compilates, in step 703 the node M combines them to the original information that may have been signed or encrypted. The step 703 shall apply the combining scheme being inverse of dividing step 100 of the writing method.

Step 704 is a conditional one relating to the initial encryption of the original payload data. If the original payload data had been encrypted, the node M may use a method provided by a writing agent W in previous steps of the process to decrypt the encrypted information. In the preferred embodiment, the writing agent W uses for this purpose a symmetric key that may have been received by the node M in step 503.

After the original payload decrypted in a case of initial encryption of the payload, or after combining all subblock of unencrypted payload, the process ends with the node M transmits the original payload data to reading agent R.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation may be made by those skilled in the art without departing from the spirit of this invention.

The invention claimed is:

1. A computer-implemented method for storing a payload data in nodes of a DLT network, comprising steps:

dividing the payload data into subblocks (x);

converting subblocks into compilates (y) using one or more logic operations;

distributing compilates (y) over a first set of nodes (C) of the DLT network;

sending data representing distribution of compilates (y) over the first set of nodes (C) to a second set of nodes (P) of the DLT network;

wherein the step of dividing payload data into subblocks (x) is adapted to divide the payload data into subblocks (x) of equal size; and wherein the step of converting subblock (x) into compilates (y) comprises:

establishing a distribution (D);

establishing a total number (j) of compilates (y) equal to the numbers of the nodes of the first set;

sampling the distribution (D) to establish a vector of coefficients (a) of a length (k) equal to number of subblocks (x), such that the samples are chosen independently from each other;

obtaining a compilate (y) for the node (j) in the first set of nodes (C) by $$y_j = \sum_{i=1}^{k} a_i x_i$$

while the distribution (D) is such that a first matrix (A) comprising coefficients (a) for calculating compilates (y), is a full rank matrix that can be converted into upper triangular matrix.

2. The method of claim 1, wherein the step of distributing compilates (y) over a first set of nodes (C) of the DLT network, is adapted to place a limited number of compilates (y) at one node of the first set of nodes (C), while a number of compilates (y) at one node of the first set of nodes (C) is lower than total number of compilates (j).

3. The method of claim 1, wherein the method comprises a further step of encrypting of data representing distribution of compilates and/or the encrypting of the compilates (y) before, before sending such data to nodes of DLT network.

4. The method of claim 1, wherein nodes of the second set of the nodes (P) of the DLT network are in a different physical locations than the nodes of the first set of the nodes (C) of the DLT network.

5. The method of claim 1, wherein the second set of nodes (P) of DLT network is disjoint with the first set of nodes (C) of DLT network.

6. The method of claim 1, wherein the payload data is encrypted before dividing into subblocks (x).

7. A computer-implemented method of reading a payload data from nodes of a DLT network, comprising steps:

reading data representing distribution of compilates over a first set of nodes (C) from a second set of nodes (P) of the DLT network;

reading compilates (y) from nodes of the DLT network of the first set of nodes (C);

converting compilates (y) into subblocks (x) using one or more logic operations, merging subblocks (x) into the payload data;

wherein the step of converting compilates into subblocks comprises:

arranging compilates ($y_j$) with coefficients (b) of a second matrix (B), while the second matrix (B) is an upper triangular matrix derived from the first matrix (A), selecting a compilate ($y_j$) that is of a rank one;

converting the compilate ($y_j$) of rank one into a subblock (x);

subtracting of the compilate ($y_j$) form remaining higher ranked compilates (y) comprising the compilate ($y_j$);

repeating the steps above until there is no more compilates to convert.

8. The method of claim 7, wherein nodes of the second set of the nodes (P) of the DLT network are in a different physical locations than the nodes of the first set of the nodes (C) of the DLT network.

9. The method of claim 7, wherein the subblocks (x) after merging them together are decrypted to retrieve payload data that was encrypted before converting it into subblocks (x).

10. A non-transitory computer-readable medium storing a computer program comprising instructions which, when the program is executed by a computer in a DLT network, cause the computer to carry out steps of the method of claim 1.

11. A non-transitory computer-readable medium storing a computer program comprising instructions which, when the program is executed by a computer in a DLT network, cause the computer to carry out steps of the method of claim 7.

* * * * *